US008596322B2

(12) United States Patent
Stoila et al.

(10) Patent No.: US 8,596,322 B2
(45) Date of Patent: Dec. 3, 2013

(54) TIRE SUPPORT APPARATUS

(75) Inventors: George Michael Stoila, Tallmadge, OH (US); Dale Eugene Wells, Massillon, OH (US); Thomas Alan Sells, Topeka, KS (US)

(73) Assignee: The Goodyear Tire & Rubber Company, Akron, OH (US)

( * ) Notice: Subject to any disclaimer, the term of this patent is extended or adjusted under 35 U.S.C. 154(b) by 174 days.

(21) Appl. No.: 12/965,069

(22) Filed: Dec. 10, 2010

(65) Prior Publication Data

US 2012/0145329 A1    Jun. 14, 2012

(51) Int. Cl.
*B29D 30/26* (2006.01)

(52) U.S. Cl.
USPC ............... 156/394.1; 156/417; 156/421.6; 211/23; 224/42.29

(58) Field of Classification Search
USPC ........... 156/415, 417, 418–420, 421.8, 406.2, 156/394.1, 421.6; 249/180; 211/23; 224/42.27, 42.29; 242/571.1, 573.7, 242/573.8
See application file for complete search history.

(56) References Cited

U.S. PATENT DOCUMENTS

| 3,085,763 | A | * | 4/1963 | Floyd, Jr. | 242/573.8 |
| 3,188,260 | A | * | 6/1965 | Nebout | 156/415 |
| 3,386,875 | A | * | 6/1968 | Grote | 156/416 |
| 3,442,747 | A | * | 5/1969 | Brey | 156/417 |
| 3,754,720 | A | * | 8/1973 | Gross et al. | 242/573.7 |
| 3,873,398 | A | * | 3/1975 | Yokoo et al. | 156/417 |
| 3,932,255 | A | | 1/1976 | Saracsan | 156/401 |
| 4,673,457 | A | * | 6/1987 | Goodfellow | 156/415 |
| 4,780,170 | A | * | 10/1988 | Landsness | 156/416 |
| 4,976,804 | A | * | 12/1990 | Kneip | 156/401 |
| 5,203,947 | A | * | 4/1993 | Boeker | 156/417 |
| 5,232,542 | A | * | 8/1993 | Norjiri et al. | 156/417 |
| 2003/0051793 | A1 | * | 3/2003 | Cavalotti et al. | 156/123 |
| 2008/0053621 | A1 | * | 3/2008 | Wang et al. | 156/394.1 |

FOREIGN PATENT DOCUMENTS

| DE | 1181901 | 11/1964 | B29D 30/26 |
| DE | 1579184 | 1/1970 | B29D 30/24 |
| EP | 0431854 | 6/1991 | B29D 30/24 |
| EP | 0466015 | 1/1992 | B29D 30/00 |
| EP | 0862987 | 9/1998 | B29D 30/26 |
| JP | 60068929 | 4/1985 | B29D 30/24 |
| JP | 11170396 | 6/1999 | B29D 30/30 |
| JP | 2001113609 | 4/2001 | B29D 30/08 |

OTHER PUBLICATIONS

European Search Report completed Mar. 7, 2012.

* cited by examiner

*Primary Examiner* — Geoffrey L Knable
(74) *Attorney, Agent, or Firm* — June E. Rickey (57) ABSTRACT

A tire support device for supporting the bead area of a tire is described. The tire support device includes an inner support member having a plurality of support vanes mounted to the support member, the support vanes radially extend from the inner support member. The tire support device further comprises a plurality of cover plates forming an outer cylindrical surface for supporting the bead area of a tire. The cover plates having an inner rib which extends radially inward, said rib having one or more guide members, each slide member slidably mounted on the support vane, wherein the guide members are slidably from a radially inward position to close the cover plates, and to a radially outward position to radially expand the tires.

17 Claims, 8 Drawing Sheets

TIRE SUPPORT APPARATUS

FIELD OF THE INVENTION

The invention relates to the field of manufacturing, and more particularly to tire manufacturing.

BACKGROUND OF THE INVENTION

In tire manufacturing, after a green tire is made, it is removed from the tire building drum and sent to the tire curing press typically via an automated process such as a conveyor belt. For very large tires such as earth mover tires, the typical automated process will not suffice due to the size and weight of the tire. Very large tires having a diameter over 50 inches need to be moved from the tire building machine to the tire mold and then manipulated into the mold. The extreme size and weight of very large tires make the transportation and manipulation of the tires very difficult without damaging the tire. It is also necessary to store the green very large tires. Because the tires are so massive, if the tires are stored in a vertical position, the tire will tend to collapse under its own weight. Thus it is desired to have a tire extraction apparatus to remove the green tire from the tire building drum capable of storing the green tire for short period of time without damaging the tire. The tire also needs to be stored in a manner which does not damage the tire. Thus it is desired to have a tire support mechanism that keeps the tire from collapsing under its own weight.

DEFINITIONS

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

BRIEF DESCRIPTION OF THE DRAWINGS

The invention will be described by way of example and with reference to the accompanying drawings in which.

DETAILED DESCRIPTION OF THE INVENTION

Figure 1:
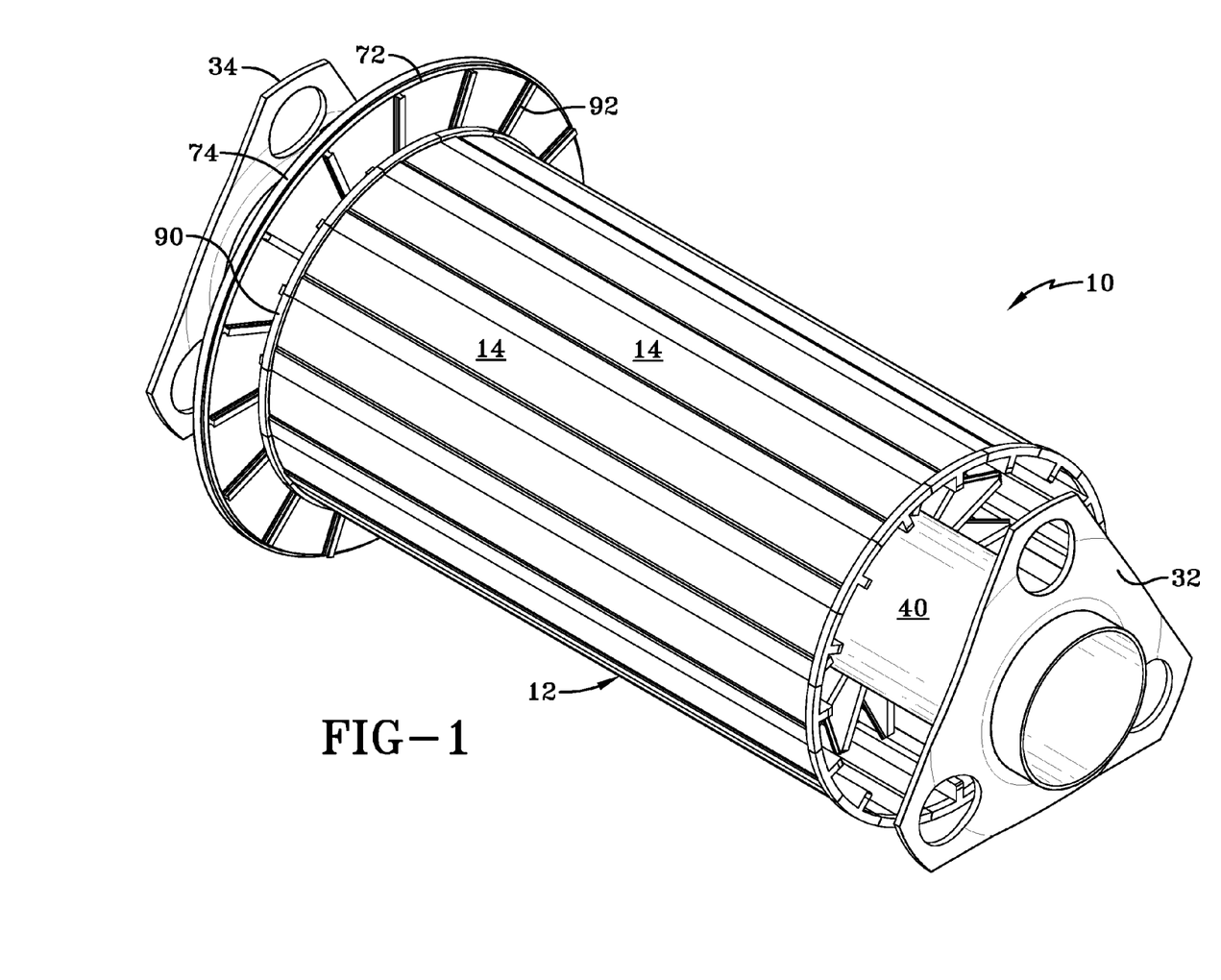
FIG. 1 is a perspective view of a tire support device of the present invention shown in the collapsed position.
Figure 2:
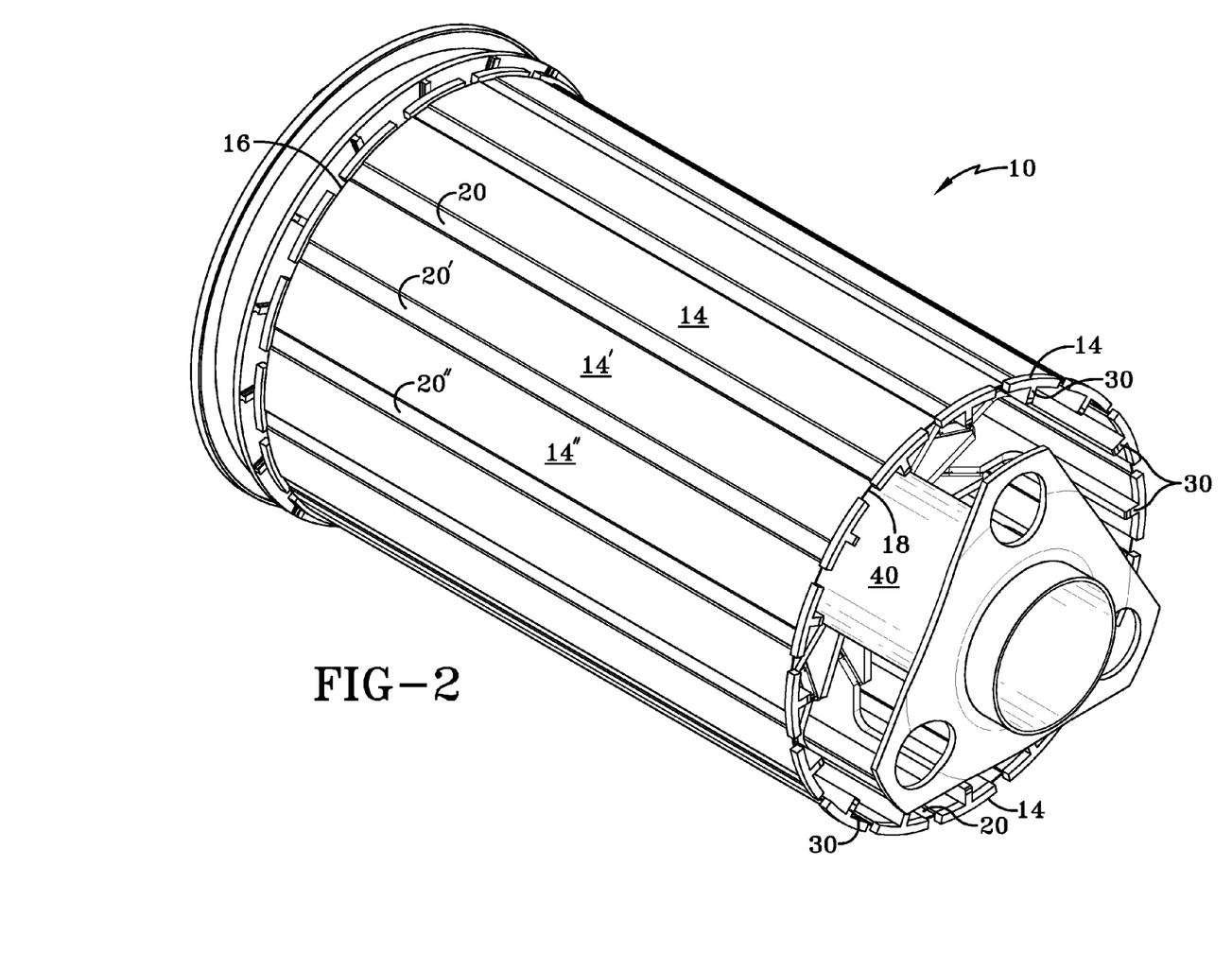
FIG. 2 is a perspective view of a tire support device of the present invention shown in the expanded position.

FIGS. 1 and 2 illustrate a tire support device 10 suitable for insertion into the interior portion of a large tire and providing a seal so that the tire can be supported. The tire support device is particularly useful for large tires having rim diameters over 30 inches, and even more particularly 40 inches, and can be used in the storage of a green tire prior to being loaded into a curing press. Such large tires tend to collapse upon themselves due to their heavy weight when stored in a vertical manner.

As shown in FIGS. 1 and 2, the tire support device comprises a long cylindrical body 12 sized for receiving the inner bead area of a large tire. The cylindrical body is expandable as shown in FIG. 2, in order to provide a seal to the beads of the tire, so that the tire can be inflated. FIG. 1 illustrates the tire support device 10 in the closed or unexpanded position. The cylindrical body of the tire support device 10 has an outer radially expandable surface 12 covered with a plurality of cover plates 14. Each cover plate 14 extends from a first end 16 to a second end 18 of the cylindrical body. Each cover plate has an expansion vane 20 that is revealed when the cylindrical body is radially expanded. The expansion vane 20 slides under the inner surface of the adjacent cover plate when the cylindrical body is radially contracted. The cover plate 14 has a T shaped cross-section, with the stem of the T formed by a radially extending rib 30. The rib 30 protrudes radially inward from the cover plate and extends along the longitudinal axis of the cover plate, from one end 16 of the cylindrical body to the other end 18. Mounted on each end 16,18 are support flanges 32,34. A central support cylinder 40 extends from one end 16 to the other end 18 and is received within the support flanges 32,34.

Figure 3:
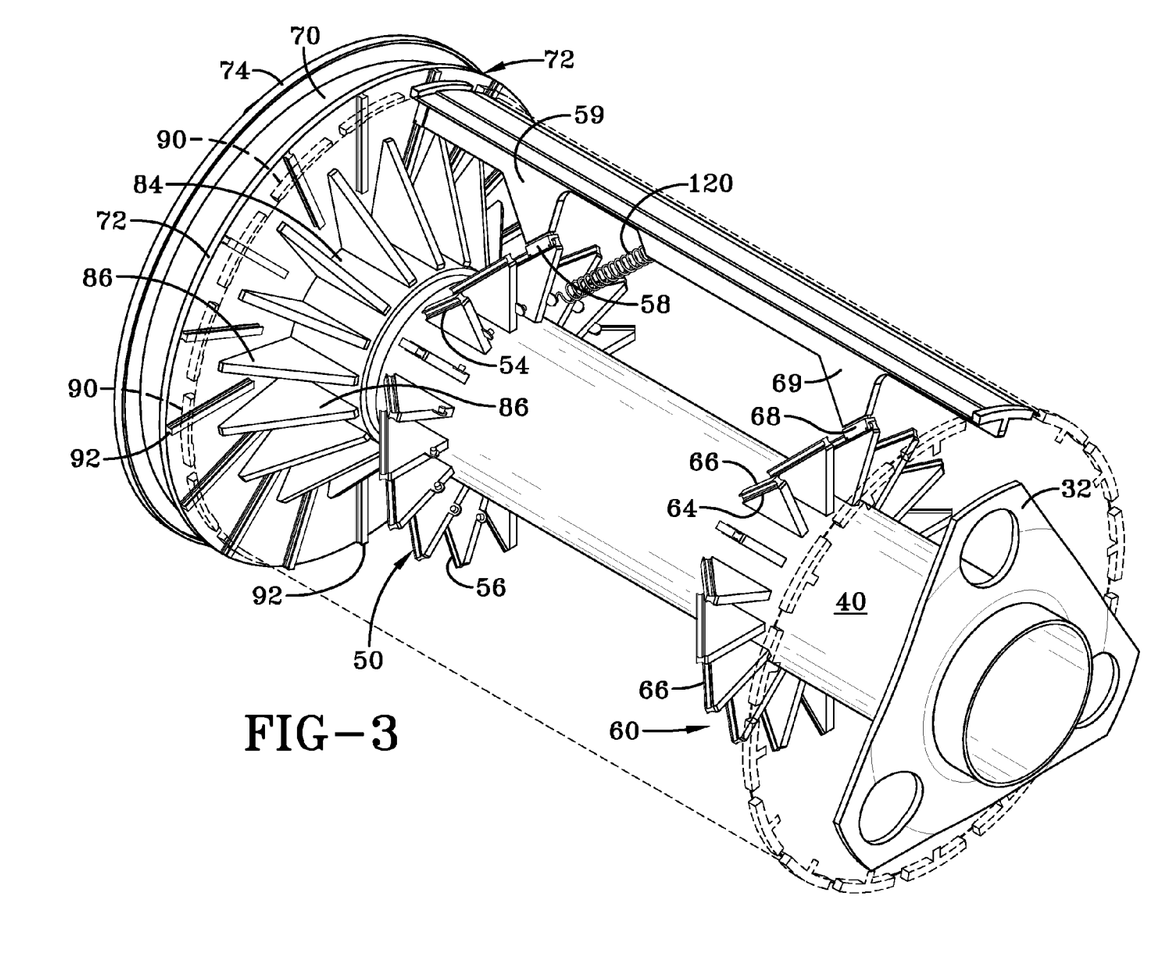
FIG. 3 is a perspective view of the tire support device shown in the expanded position with a portion of the outer cover removed.
Figure 4:
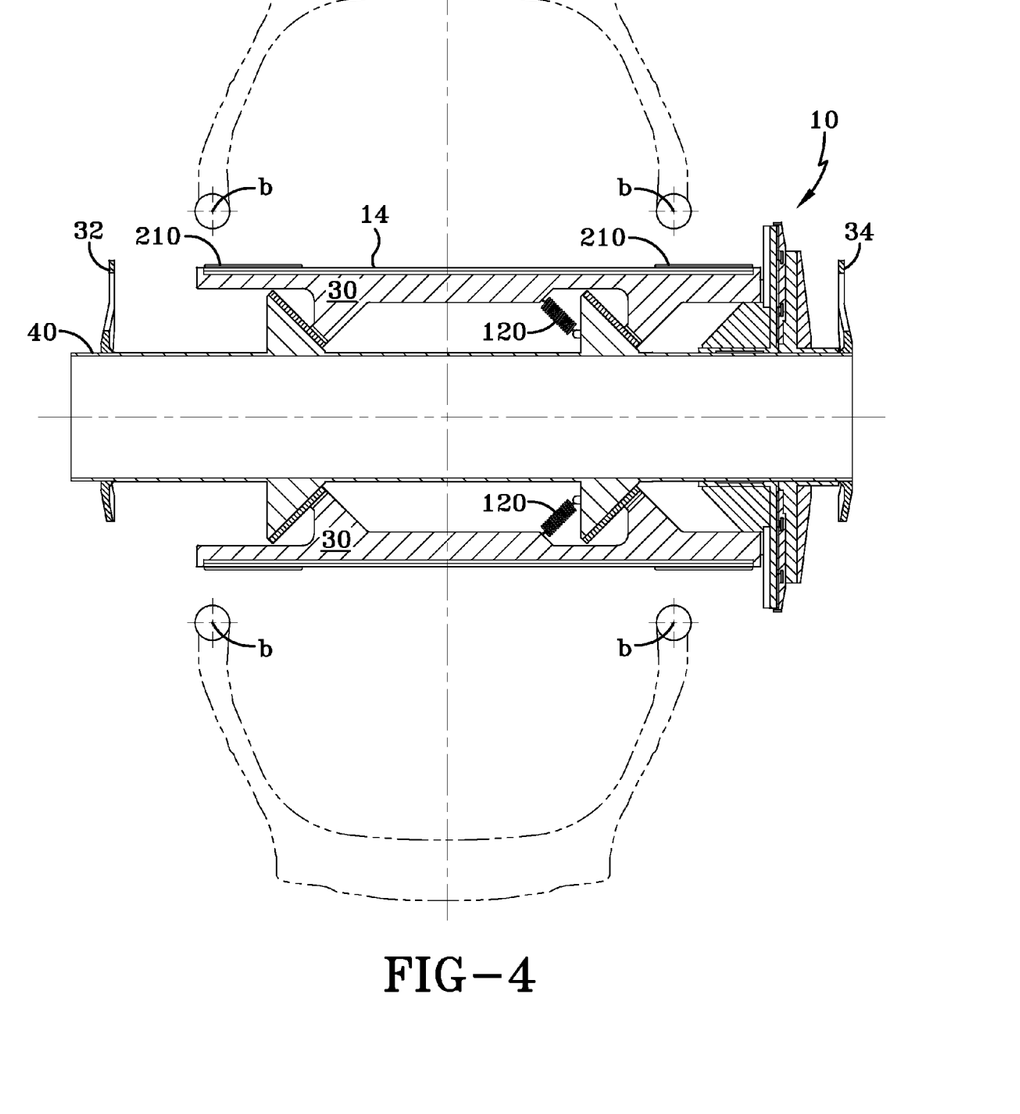
FIG. 4 is a is cross-sectional view of the tire support device prior to being mounted within a tire and in a collapsed position.

FIG. 3 illustrates the tire support device with the cover plates 14 shown in phantom, revealing a first and second set of stationary support vanes 50, 60. The stationary support vanes 50, 60 are shaped like a pyramid or triangle and are oriented in a radial direction. Each support vane has an outer radial surface 54, 64 with a guide track 56, 66 mounted thereon. A guide member 58,68 is slidably received on the guide track 56, 66. The guide member 58,68 is mounted to a respective flange 59,69 which extends radially inward from the rib 30. As the guide members 58,68 slide radially outward on guide track 56,66, the outer cylindrical surface of the tire support device radially expands. The outer cylindrical surface 12 is formed by the cover plates 14 which radially expand to reveal the expansion vanes 20. The cover plates are sufficiently rigid so that the guide members 58, 68 are in sync. As the outer surface 12 of the tire support device radially expands, the tire beads are engaged and sealed by the outer surface 12.

Figure 5:
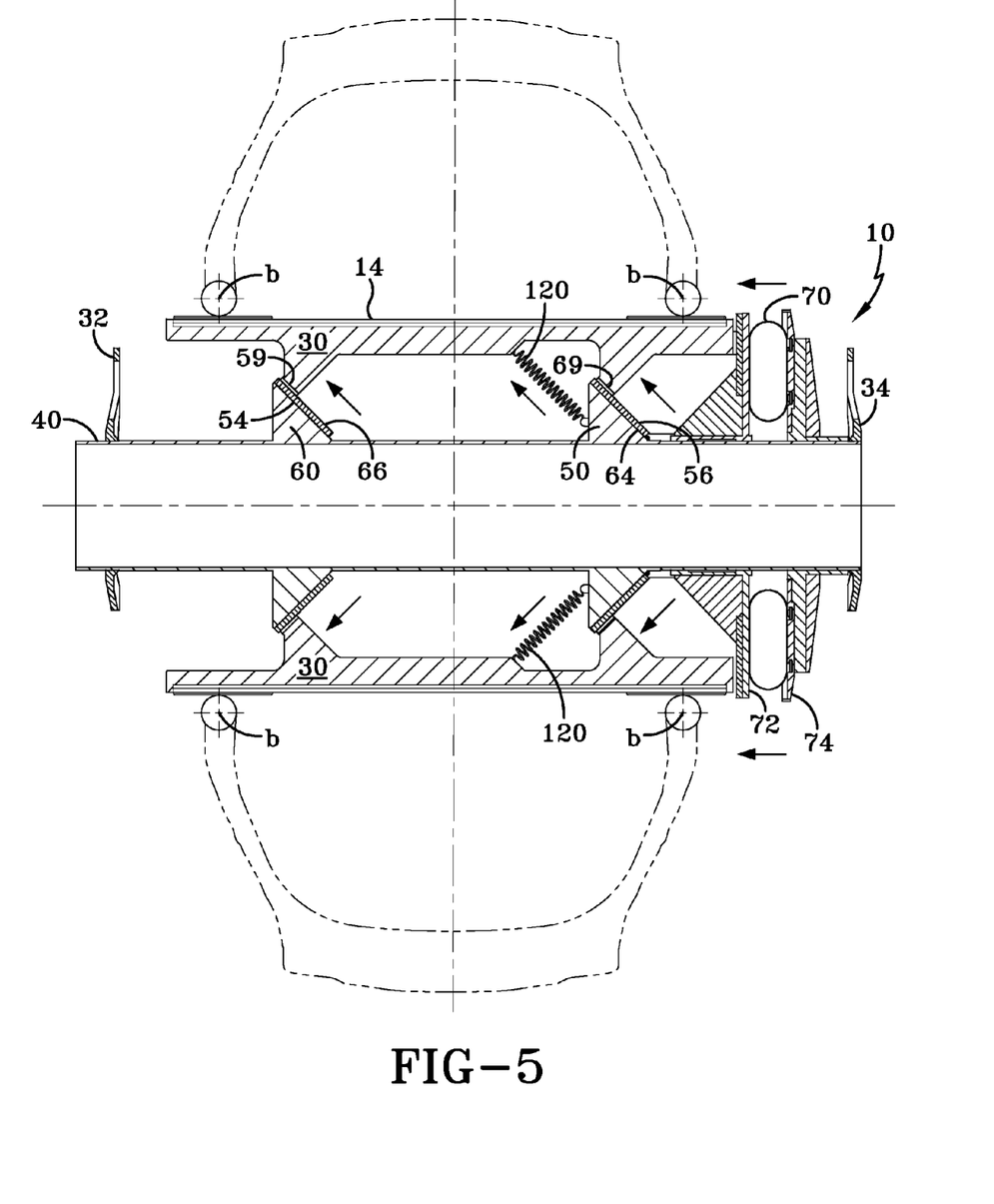
FIG. 5 is a is cross-sectional view of the tire support device mounted within a tire in the expanded position.
Figure 6:
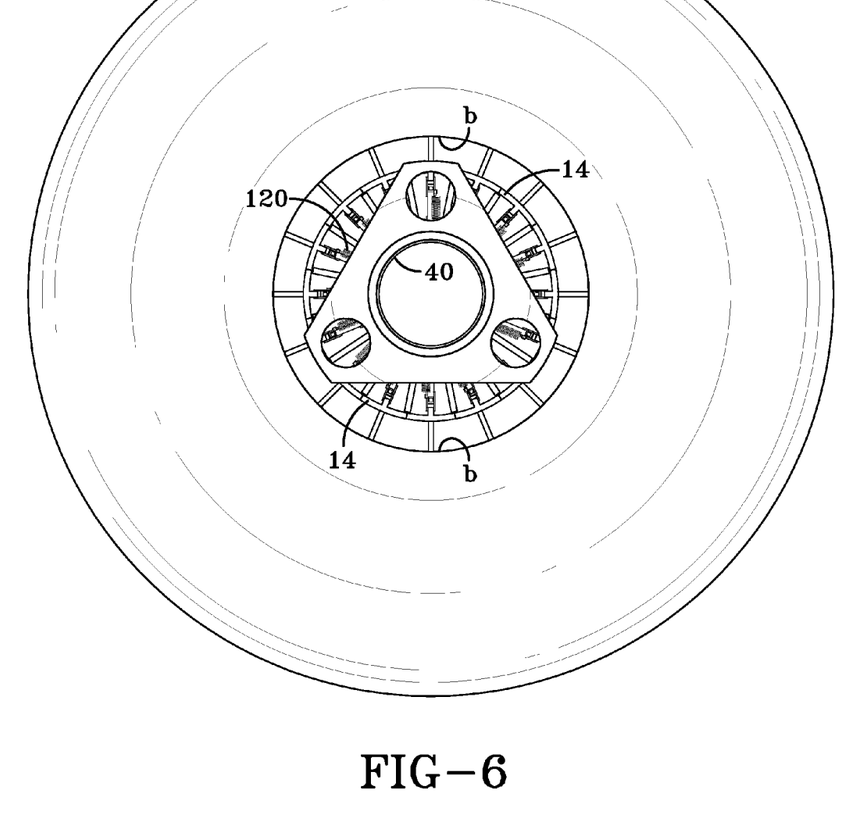
FIG. 6 is a side view of the tire and the tire support device mounted within a tire in the unexpanded position.
Figure 7:
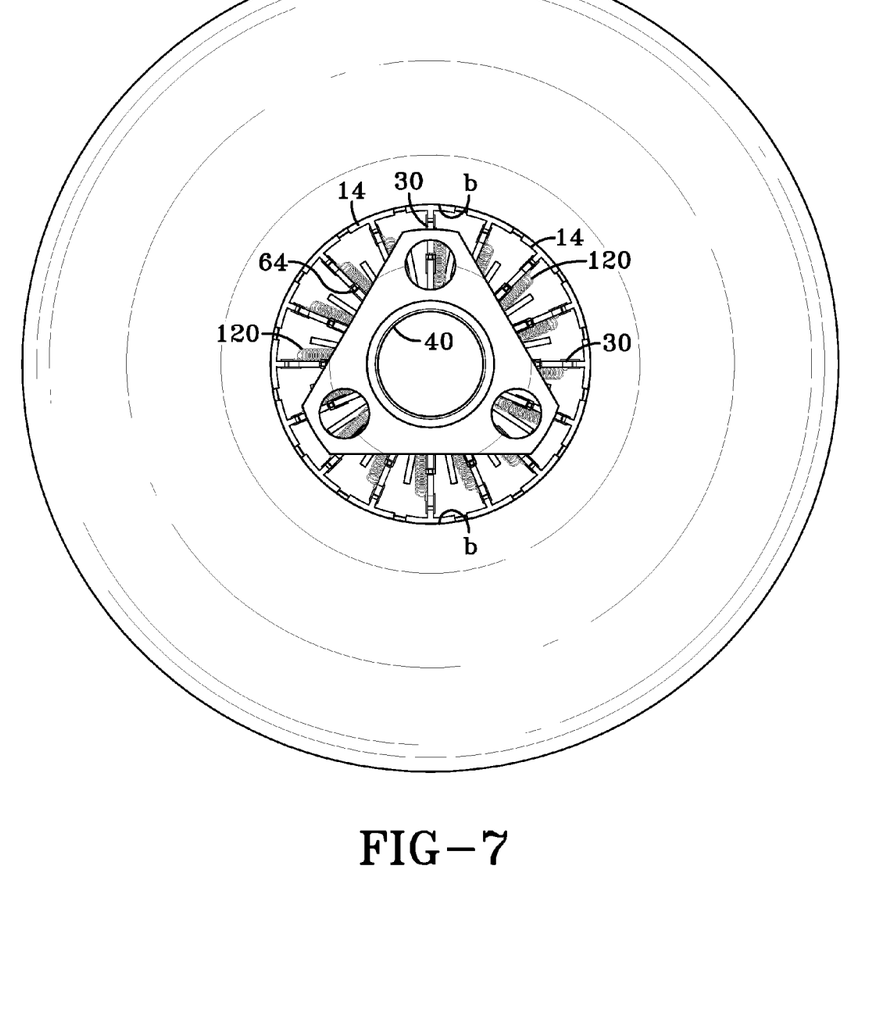
FIG. 7 is a side view of the tire and the tire support device mounted within a tire in the expanded position.
Figures 8, 9:
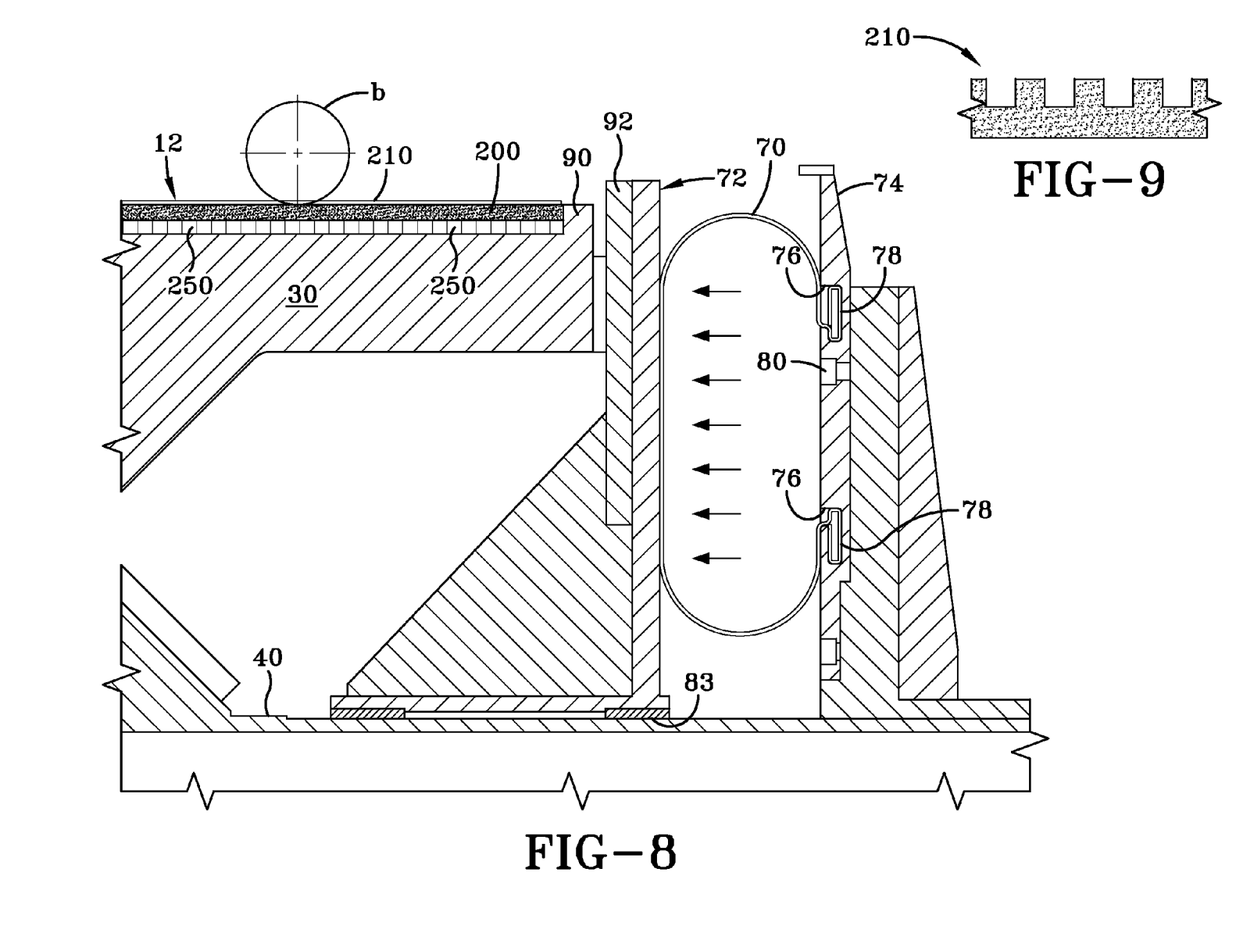
FIG. 8 is a side view of a portion of the tire support device showing a partial view of the bladder actuator assembly shown in the inflated position.
FIG. 9 is a cross-sectional view of a portion of a sliding membrane.

As shown in FIGS. 5 and 8, the tire support device 10 is actuated by an annular bladder 70 located between a pressure plate 72 and an outer mounting flange 74. The bladder 70 has feet 76,78 mounted in recesses 77,79 of mounting flange 74. The pressure plate 72 further comprises a hole 80 for supplying air or pneumatic fluid to the bladder. The pressure plate 72 is formed of an annular flat plate with a support collar 84 mounted orthogonally thereto. Aligned holes 83,85 extend through the respective pressure plate 72 and the support collar 84 for receiving the central support cylinder 40. The support collar 84 has a plurality of triangular shaped support members 86 which are welded to the pressure plate 72 and the support collar 84. As the bladder is inflated, the bladder expands and exerts pressure on the pressure plate 72, sliding the collar and plate assembly 72,84 axially inward on the annular surface of the central support cylinder 40. As the collar and plate assembly slides axially inward, a plurality of T shaped actuators 90 slide on radially oriented tracks 92 mounted on the pressure plate 72, on the side of the plate opposite the bladder. The T shaped actuators have a first end slidably received on the tracks 92, and a second end connected to a respective end of a cover plate 14. As the annular bladder expands, the pressure plate is actuated axially inward, and the T shaped actuators 90 slide radially outward on the radial tracks 92, radially expanding one end of the outer cylindrical surface of the tire support device. At the same time, the axial inward motion of the pressure plate additionally actuates the guide members 58,68 to slide radially outward on guide tracks 56, 66. A plurality of hand flywall set stopping bolts provide a stop to prevent the bladder from over expanding.

After the outer cylindrical surface of the tire support system has been expanded to seal the beads, air or pneumatic fluid from port 99 is used to fill the tire with fluid. The internal inflation is preferably very low pressure in the range of about 1.5 to 2.5 psig. When the tire is in the expanded state, the effect of gravity is minimized, and the tire can be stored without damage. Additionally, the tire support device can be rotated by external actuation (not shown) to further minimize the effect of gravity weight distortion.

In order to remove a tire from the tire support device, a first valve (not shown) is opened and the tire is deflated. The tire support surface is retracted by opening a second valve (not show to release the bladder fluid, resulting in the radial compression of the outer surface of the tire support device. Retraction springs 120 located between the ribs 30 and support vanes 50 exert a spring force on the ribs, pulling the ribs radially inward. Instead of retraction springs 120, gas charged cylinders (not shown) may be used to aid in retraction and stroke synchronization.

The outer surface 12 of the tire support device may optionally comprise an outer elastomeric or rubber sleeve 200. The optional rubber sleeve 200 extends from one end 32 to the other end 34. The optional rubber sleeve 200 is preferably formed of a thick rubber that is formed of a soft rubber compound. The rubber sleeve functions to seal the tire beads and also to apply a compressive force to collapse the outer surface of the device when the bladder is deflated.

A second optional sliding membrane 210 may be located over the rubber sleeve 200 in a coannular fashion. The sliding membrane 210 is preferably fixed to the rubber sleeve at the centerline, and with the outer ends of the sliding membrane being free to move. The sliding membrane may be fixed to the rubber sleeve by curing, stitching, or otherwise known to those skilled in the art. The sliding membrane is preferably thinner (3-10 mm in thickness) than the sleeve 200 (thickness of 0.67-1.25 inch). It is preferred that the sliding membrane have a varied cross section, such as shown in FIG. 9, wherein the side profile of the membrane has peaks and valleys or castsellations. The membrane may further comprise small holes. The varied cross-sectional profile and optional small hole perforation of the sliding membrane may help facilitate sliding of the beads onto the sleeve.

The inner radial surface of the sleeve may further comprise a plurality of cells 250 which can be inflated to a desired pressure. When inflated, the cells 250 function as bladder bags and help to resist the translation of the tire beads. The cells can be inflated and deflated as needed.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire support device for supporting the bead area of a tire, the device comprising:
an inner support member having a plurality of support vanes mounted to the support member, said support vanes radially extend from the inner support member;
a plurality of cover plates forming an outer cylindrical surface for supporting the bead area of a tire; each cover plate having an expansion vane which is slidable under an adjacent cover plate, wherein the outer cylindrical surface of the tire support device is covered by a first rubber sleeve and a second rubber sleeve located over and joined to the first rubber sleeve, wherein the outer lateral ends of the second rubber sleeve are in contact with but not connected to the first rubber sleeve whereby the outer lateral ends are free to move, said cover plates having an inner rib which extends radially inward, said rib having one or more guide members, each guide member being slidably mounted on the support vane, wherein the guide members are slidable from a radially inward position to close the cover plates and conceal the expansion vanes by sliding the expansion vanes under an adjacent cover plate, and to a radially outward position to radially expand the outer cylindrical surface of the tire support device and reveal the expansion vanes.

2. The tire support device of claim 1 wherein the inner ribs are connected to a movable plate, wherein the cover plates are actuated by the movable plate.

3. The tire support device of claim 2 wherein the movable plate is actuated by an inflatable bladder.

4. The tire support device of claim 3 wherein the inflatable bladder is annular.

5. The tire support device of claim 1 wherein said support vanes are arranged in a first and second set, wherein the first set is located at a first end of the device and the second set is located at a second end of the device.

6. The tire support device of claim 2 wherein the movable plate has a support collar mounted thereon.

7. The tire support device of claim 6 wherein a plurality of support members are connected to the support collar and the movable plate.

8. The tire support device of claim 2 wherein the movable plate has a plurality of radially oriented tracks, and an end of the cover plate having a guide member positioned for reception on a respective track.

9. The tire support device of claim 1 wherein the first rubber sleeve is thicker than the second rubber sleeve.

10. The tire support device of claim 9 wherein the first rubber sleeve has a thickness in the range of 0.67 to 1.25 inches.

11. The tire support device of claim 9 wherein the second rubber sleeve has a thickness in the range of 3-10 millimeters.

12. The tire support device of claim 9 wherein the first rubber sleeve is coannular with respect to the second rubber sleeve.

13. The tire support device of claim 9 wherein the second rubber sleeve has small holes.

14. The tire support device of claim 9 wherein the second rubber sleeve has a varied cross-sectional profile.

15. The tire support device of claim 9 wherein the second rubber sleeve has a cross-sectional profile with peaks and valleys.

16. A tire support device for supporting the bead area of a tire, the device comprising:
an inner support member having a plurality of support vanes mounted to the support member, said support vanes radially extend from the inner support member;
a plurality of cover plates forming an outer cylindrical surface for supporting the bead area of a tire;
said cover plates having an inner rib which extends radially inward, said rib having one or more guide members, each guide member being slidably mounted on the support vane, wherein the guide members are slidable from a radially inward position to close the cover plates, and to a radially outward position to radially expand the outer cylindrical surface of the tire support device, wherein the outer cylindrical surface is covered by a first rubber sleeve and a second rubber sleeve located over and joined to the first rubber sleeve, wherein the first rubber sleeve is thicker than the second rubber sleeve, wherein a centerline of the second rubber sleeve is fixed to the first rubber sleeve, and a first and second outer end of the second rubber sleeve are in contact with but not connected to the first rubber sleeve whereby the first and second outer ends are free to move.

17. A tire support device for supporting the bead area of a tire, the device comprising:
an inner support member having a plurality of support vanes mounted to the support member, said support vanes radially extend from the inner support member;
a plurality of cover plates forming an outer cylindrical surface for supporting the bead area of a tire; said cover plates being radially expandable, wherein the outer cylindrical surface is covered by a first rubber sleeve and a second rubber sleeve located over and joined to the first rubber sleeve, wherein a portion of the second rubber sleeve is fixed to the first rubber sleeve wherein the outer ends of the second rubber sleeve are in contact with but not connected to the first rubber sleeve whereby the outer ends are free to move.

* * * * *